United States Patent
Pan (10) Patent No.: US 11,981,453 B1
(45) Date of Patent: May 14, 2024

(54) SYSTEM FOR AERIAL VEHICLE LANDING AND METHOD FOR CONTROLLING SYSTEM FOR AERIAL VEHICLE LANDING

(71) Applicant: FAIRTECH CORPORATION, Hsinchu (TW)

(72) Inventor: Jui-Pao Pan, Hsinchu (TW)

(73) Assignee: FAIRTECH CORPORATION, Hsinchu (TW)

( * ) Notice: Subject to any disclaimer, the term of this patent is extended or adjusted under 35 U.S.C. 154(b) by 0 days.

(21) Appl. No.: 18/472,960

(22) Filed: Sep. 22, 2023

Related U.S. Application Data (60) Provisional application No. 63/487,797, filed on Mar. 1, 2023.

(51) Int. Cl.
*B64F 1/02* (2006.01)

(52) U.S. Cl.
CPC .................... *B64F 1/029* (2020.01)

(58) Field of Classification Search
CPC ...... B64F 1/029; B64F 1/0295; B64F 1/0299; B66D 1/7489; B64C 2201/027; B64C 2201/108; B64C 39/024; B64C 2201/021; B64C 2201/182
See application file for complete search history.

(56) References Cited

U.S. PATENT DOCUMENTS

| | | | | |
|---|---|---|---|---|
| 3,081,964 A * | 3/1963 | Quenzler | ............ | B64C 29/0033 244/54 |
| 7,175,135 B2 * | 2/2007 | Dennis | ............ | B64F 1/04 244/110 F |
| 7,264,204 B1 * | 9/2007 | Portmann | ............ | B63B 35/52 244/110 F |
| 8,944,373 B2 * | 2/2015 | Dickson | ............ | B64F 1/029 244/110 C |
| 10,053,236 B1 * | 8/2018 | Buchmueller | ........ | G06T 7/0004 |
| 2012/0223182 A1 * | 9/2012 | Gilchrist, III | ......... | B64F 1/0297 244/110 F |

(Continued)

FOREIGN PATENT DOCUMENTS

| | | |
|---|---|---|
| DE | 202022105914 U1 | 11/2022 |
| FR | 3063070 A1 | 8/2018 |
| JP | 2021181710 A | 11/2021 |

OTHER PUBLICATIONS

European Search Report of EP family patent Application No. 23199975.6, mailed on Feb. 19, 2024.

(Continued)

*Primary Examiner* — Justin M Benedik
(74) *Attorney, Agent, or Firm* — WPAT, P.C.; Anthony King (57) ABSTRACT

A system for aerial vehicle landing is provided. The system includes a displacement compensation unit and a traction control module. The displacement compensation unit includes a top portion, a bottom portion, and at least one actuators connected to the top portion and the bottom portion, configured to provide a displacement compensated top portion to engage with an aerial vehicle. The traction control module includes a traction generator connected to a tether. Through the tether the aerial vehicle is tractioning toward the top portion of the displacement compensation unit. A method for controlling a system for aerial vehicle landing is also provided.

20 Claims, 6 Drawing Sheets

(56) References Cited

U.S. PATENT DOCUMENTS

| | | | |
|---|---|---|---|
| 2015/0129716 A1* | 5/2015 | Yoffe | B64F 1/029 |
| | | | 244/110 C |
| 2016/0200437 A1 | 7/2016 | Ryan et al. | |
| 2017/0225784 A1* | 8/2017 | Hayes | B64C 39/024 |
| 2018/0162528 A1* | 6/2018 | McGrew | B64C 37/02 |
| 2018/0327113 A1* | 11/2018 | von Flotow | F15B 9/14 |
| 2023/0034750 A1 | 2/2023 | Piasecki et al. | |

OTHER PUBLICATIONS

English machine translation of JP2021181710A.
English machine translation of FR3063070A1.
English machine translation of DE202022105914U1.

* cited by examiner

FIG. 5

SYSTEM FOR AERIAL VEHICLE LANDING AND METHOD FOR CONTROLLING SYSTEM FOR AERIAL VEHICLE LANDING

PRIORITY CLAIM AND CROSS-REFERENCE

This application claims the benefit of prior-filed U.S. provisional application No. 63/487,797 filed Mar. 1, 2023 and incorporate its entirety herein by reference.

FIELD

The present disclosure relates to a system for aerial vehicle landing and a method for controlling system for aerial vehicle landing, particularly, the system and the method can be implemented on aerial vehicle landing under severe weather or environmental conditions such as on a swaying docket of a watercraft on water and/or under strong wind environment.

BACKGROUND

Landing under severe condition has long been a challenging problem to aerial vehicles. Short of taxiing distance, strong winds, storms, or landing on a swaying platform all escalate the difficulty to landing of an aerial vehicle. When the nature forces contributing to the severe condition exceeds certain limit, a landing system shall be implemented to ensure the landing process at least does not damage any function of the aerial vehicles. A method and system for landing of aerial vehicles which is applicable to all types of aerial vehicles, including, but not limited to, commercial aircraft, cargo aircraft, unmanned aerial vehicles, or remotely piloted aircraft, is therefore required to meet this need.

BRIEF DESCRIPTION OF THE DRAWINGS

Aspects of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component, region, layer or section from another. The terms such as "first", "second", and "third" when used herein do not imply a sequence or order unless clearly indicated by the context.

Present disclosure provides a system for aerial vehicle landing. The system allows the aerial vehicle to land under severe weather or environmental conditions such as on a swaying docket of a watercraft on water and/or under strong wind environment.

Figure 1:
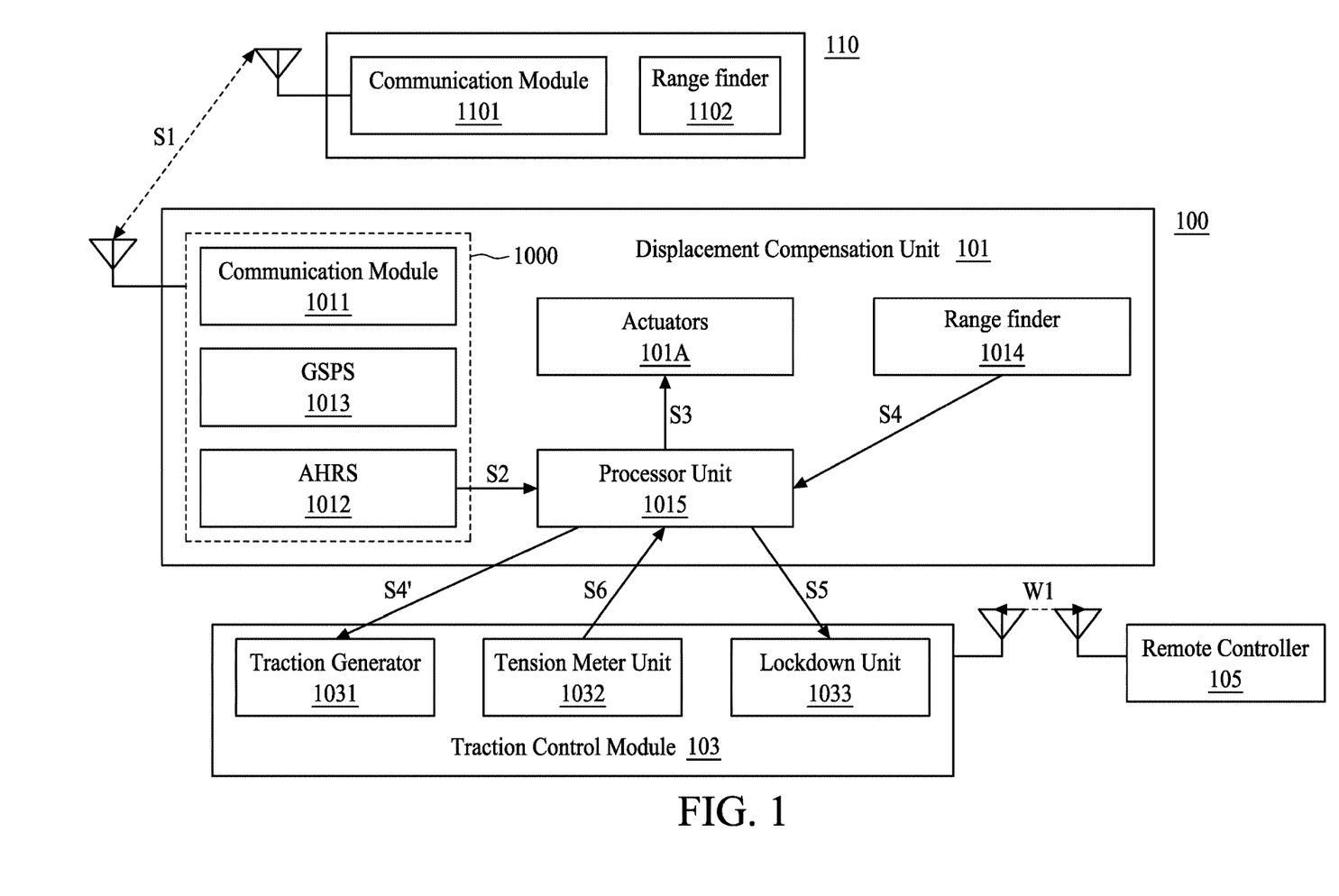
FIG. 1 illustrates a block diagram of a system for aerial vehicle landing, according to some embodiments of the present disclosure.
Figure 2A:
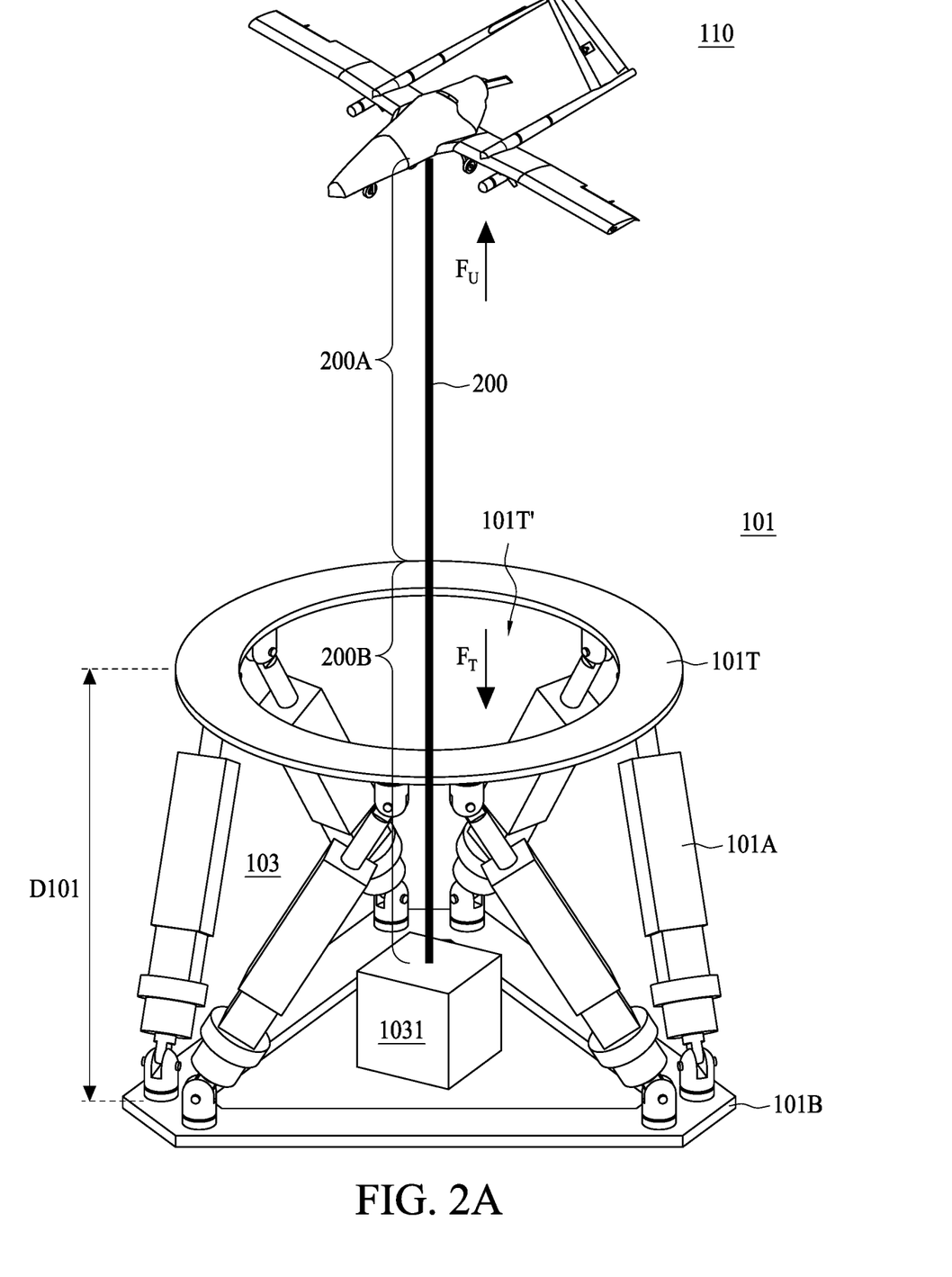
FIG. 2A illustrates a perspective view of a displacement compensation unit and a traction control module, according to some embodiments of the present disclosure.
Figure 2B:
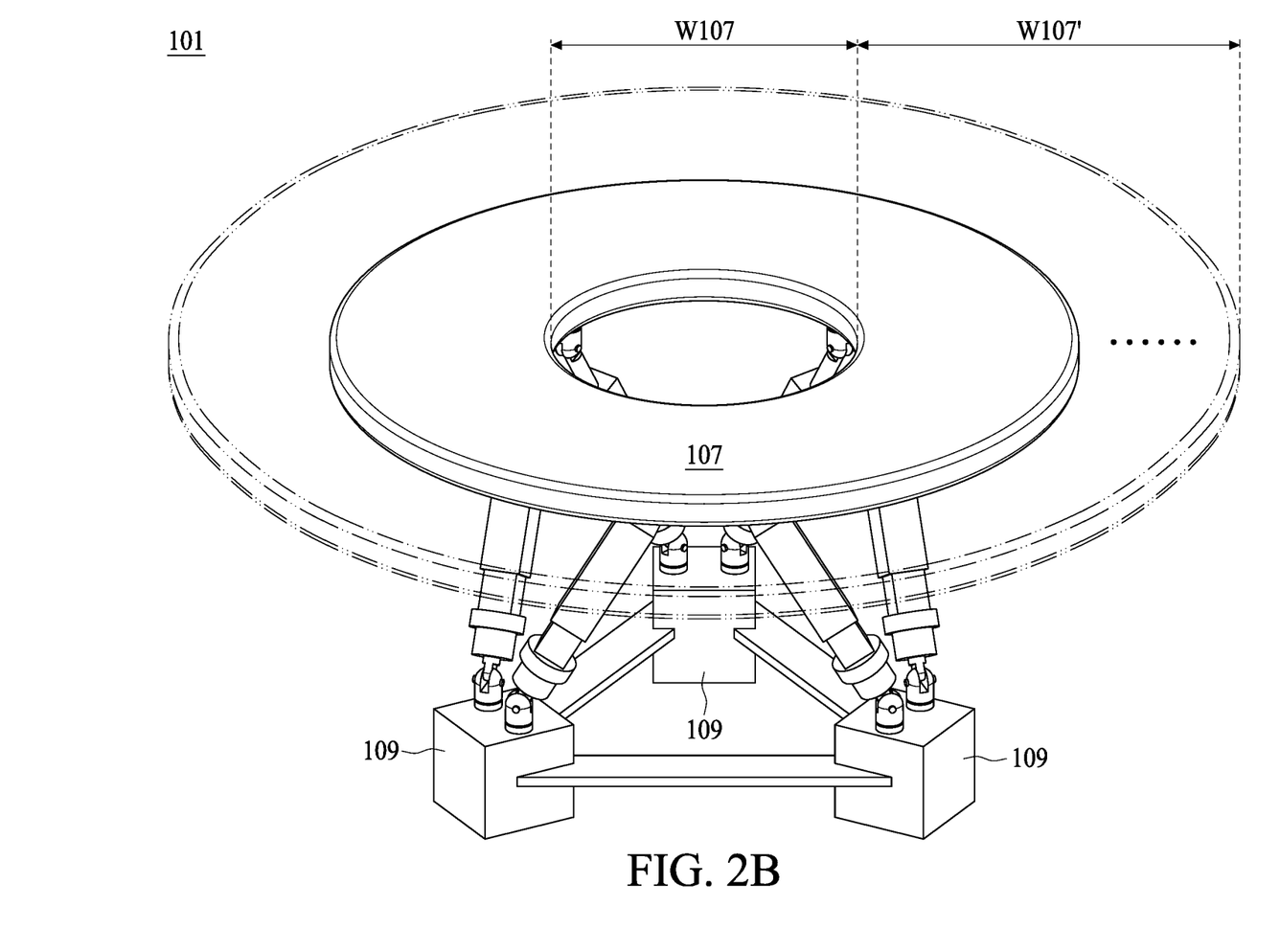
FIG. 2B illustrates a perspective view of a displacement compensation unit and a traction control module, according to some embodiments of the present disclosure.
Figure 3:
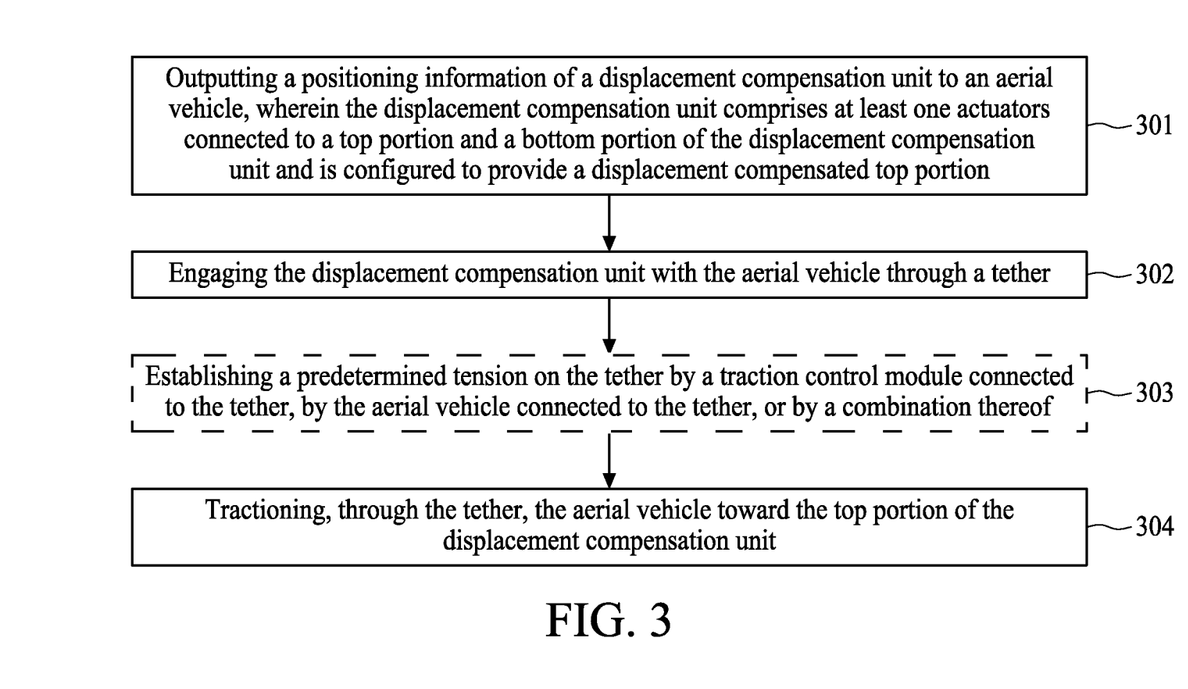
FIG. 3 is a flow of operations showing a method for controlling a system for aerial vehicle landing, according to some embodiments of the present disclosure.

Referring to FIG. 1 and FIG. 2A, FIG. 1 illustrates a block diagram of a system 100 for aerial vehicle landing, according to some embodiments of the present disclosure, and FIG. 2A illustrates a perspective view of a displacement compensation unit 101 and a traction control module 103, according to some embodiments of the present disclosure. The system 100 includes a displacement compensation unit 101 and a traction control module 103 affixed to the displacement compensation unit 101 or as a component separated from the displacement compensation unit 101 as long as the displacement compensation unit 101 and the traction control module 103 are at least communicatively coupled or electrically connected. From the perspective view showing in FIG. 2A, the displacement compensation unit 101 includes a top portion 101T and a bottom portion 101B opposite to the top portion 101T. In some embodiments, the top portion 101T can be a ring-like structure with a circular or oval plate having an opening 101T' allowing components, such as a tether 200, to pass there through. The dimension of the opening 101T' may be varied based on design as long as necessary components can freely pass through. The dimension of the opening 101T' can also be as large as possible that allows the components, such as a tether 200, not only to pass through but also to be tractioned in an angle less than, for example, 45 degrees. In some embodiments, the bottom portion 101B can be a solid plate or a hollow plate. The bottom portion 101B is configured to dispose on a platform, such as a docket of a watercraft, and provide sufficient fixation between the displacement compensation unit and the platform. In some embodiments, the system 100 further includes a non-slip device configured to temporarily limit any relative motion between the displacement compensation unit 101 and the platform such as the docket of a watercraft. In some embodiments, the non-slip device includes, but not limited to, electromagnet, electromagnetic switches, or the like. In some embodiments, the non-slip device includes a fixating device 109 such as screw and bolts or the like, at bottom portion 101B of the displacement compensation unit 101, as shown in FIG. 2B. The non-slip device may or may not be integrated with the displacement compensation unit 101.

Referring to FIG. 2A, the displacement compensation unit 101 further includes at least one actuators 101A connecting the top portion 101T and the bottom portion 101B at its opposite ends. The number of the at least one actuators 101A can be four, six, eight, or as many as needed, in order to provide a displacement compensated top portion 101T for engaging with an aerial vehicle at its landing. Referring to FIG. 1, the at least one actuator 101A is controlled by a processor unit 1015 through an electrical signal S3, where the processor unit 1015 receives a spatial information signal S2 transmitted from an attitude heading reference system (AHRS) 1012 installed at a position proximal to a top portion 101T of the displacement compensation unit 101. The AHRS 1012 reads the vertical deviation of the pitch and roll of the displacement compensation unit 101 and send the spatial information signal S2 to the processor unit 1015. As described herein, the spatial information signal S2 includes as least the attitude and the heading direction of the displacement compensation unit 101. After calculation, the processor unit 1015 further control the orientation, stretching, or withdrawal of each of the at least one actuators 101A to achieve a movement-free, or displacement compensated, top portion 101T. Alternatively stated, the bottom portion 101B disposed on the platform following the movement of the platform, whereas the top portion 101A of the displacement compensation unit 101 provide a stabilized surface in the 3-dimension space unaffected by the movement of the platform, or the bottom portion 101B, via at least three linear movements (X, Y, Z) and three rotations (pitch, roll, and yaw) of the one or more actuators 101A.

Referring to FIG. 2A, the dimension of the top portion 101T and the bottom portion 101B may be varied based on the corresponding dimension of the aerial vehicle to be landed thereon. In some embodiments, the top portion 101T and the bottom portion 101B of the displacement compensation unit 101 are spaced apart by a particular distance D101 proportional to the dimension of the corresponding aerial vehicle to be landed thereon so as to prevent any portion of the aerial vehicle from striking the platform, or the docket of the watercraft, during the process of landing. In some embodiments, the particular distance D101 can be at least 75 centimeters when a wing-to-wing dimension of the corresponding aerial vehicle is about 4.5 meters. In addition, the displacement compensation unit 101 is designed with proper mechanical joints to reduce its volume when not in use and to facilitate transportation or storage.

Referring to FIG. 1 and FIG. 2A, the system 100 further includes a traction control module 103 disposed between the bottom portion 101B and the top portion 101T. The traction control module 103 can be disposed anywhere between the respective horizontal levels of the bottom portion 101B and the top portion 101T. For example, the traction control module 103 can be placed outside of the vertical projection of the displacement compensation unit 101 on the platform of the watercraft. Although can be disposed in other locations, the traction control module 103 is likely to be disposed under a vertical projection of the aerial vehicle to be landed. The traction control module 103 is configured to exert a traction force on the aerial vehicle so as to bring the aerial vehicle close to the top portion 101T of the displacement compensation unit 101. The traction control module 103 may include a tether 200 and a traction generator 1031 connected thereto for retrieving the tether 200 connected to the aerial vehicle with a joint device (not shown). In some embodiments, one end of the tether 200 is devised at the aerial vehicle and can be released from the aerial vehicle to form a connection with the traction generator 1031 using a joint device (not shown), such as a mechanical hook, a magnetic coupling device, an electromagnetic coupling device, or the like. In some embodiments, the tether 200 includes a first portion 200A extending from the aerial vehicle and a second portion 200B extending from the traction generator 1031 of the traction control module 103, in this case, the end of the first portion 200A and the end of the second portion 200B proximal to the end of the first portion 200A can be manually connected through a joint device (not shown). In some embodiments, the traction generator 1031 includes, but not limited to, an electric motors operated under magnetism, electrostatics, or piezo-electricity.

In some embodiments, the tether 200 is composed of suitable materials which are able to sustain the tension exerted on the tether 200 during the landing process and with sufficient strength and stiffness to endure the severe environment conditions. Other attributes to a suitable tether include breaking strength, knot strength, stretch, abrasion resistance, and the like. Suitable materials for tether 200 may include plastics (e.g., nylon, polyvinylidene fluoride, polyethylene, polyvinyl chloride), stainless-steel, metal alloys (titanium-nickel, copper alloys, lead alloys).

Referring to FIG. 1, the displacement compensation unit 101 of the system 100 further includes a communication module 1011, which is used to transmit at least a positioning information signal S1 of the displacement compensation unit 101 to a corresponding communication module 1101 of the aerial vehicle 110. The respective communication modules 1011, 1101 can be implemented via one or more radio frequency communication modules, for example, using Wi-Fi in star network, tree network, or in mesh network. In some embodiments, the positioning information signal S1 includes the location and heading information generated from two or more global satellite positioning system (GSPS) 1013 or Global Navigation Satellite System (GNSS) installed in the displacement compensation unit 101, and/or speed information such as the speed information of the watercraft loaded with the system for aerial vehicle landing 100. In some embodiments, the GSPS implement satellite-guided navigation, such as the real time kinematic (RTK) positioning approach. The number of the GSPS 1013 may vary depending on the requirements. In some embodiments, two GSPS devices are installed on the top portion 101T of the displacement compensation unit 101 in order to acquire a heading information of the displacement compensation unit 101, or the watercraft, without movement of the displacement compensation unit 101. Alternatively stated, compared to a single GSPS scenario, two GSPS can instantaneously provide the heading information without time delay spent on accumulating movement data of the displacement compensation unit 101. For example, the two GSPS devices can be located on the ring-like structure of the top portion 101T and separated from each other by the maximum distance, for example, two GSPS devices are arranged to align to the bow of the watercraft or the heading direction of the watercraft. With such arrangement, two GSPS devices can provide heading and positioning information of higher accuracy than that provided by a single GSPS to the aerial vehicle 110. More than two GSPS devices can also be implemented with suitable arrangement on the displacement compensation unit 101.

In some embodiments, the positioning information signal S1 also includes information generated from the attitude heading reference system (AHRS) 1012 installed in the displacement compensation unit 101. AHRS 1012 gathers and provides attitude information (roll, pitch, and yaw), heading information, and moving speed information of the displacement compensation unit 101 to the communication module 1011, which is then transmitted to the aerial vehicle 110. In some embodiments, the AHRS 1012 is installed proximal to the top portion 101T of the displacement compensation unit 101. As shown in FIG. 1, the communication module 1011, the AHRS 1012, and the two or more global satellite positioning systems 1013 in combination form a beacon 1000 of the displacement compensation unit 101 providing navigation information to the aerial vehicle 110.

Also shown in FIG. 1 is an aerial vehicle 110 to be landed on the displacement compensation unit 101. In addition to the communication module 1101 communicatively coupled to the communication module 1011 installed on the displacement compensation unit 101, the aerial vehicle 110 further includes one or more range finder 1102 to determine a distance between two objects. For example, the range finder 1102, such as a laser device, installed at a bottom of the aerial vehicle 110 is used to probe a distance between the bottom of the aerial vehicle and the top portion 101T of the displacement compensation unit 101. When the distance set forth is equal to or smaller than a predetermined value, for example, 500 mm or 300 mm, the range finder 1102 may trigger the aerial vehicle 110 to stop propelling and prepare for further landing engagement with the displacement compensation unit 101.

On the other hand, the displacement compensation unit 101 of the system 100 further includes one or more range finder 1014 to determine a distance between two objects. For example, the range finder 1014, such as a laser device, installed at the top portion 101T of the displacement compensation unit 101 is used to probe a distance between the top portion 101T and a bottom of the aerial vehicle 110. When the distance set forth is equal to or smaller than a predetermined value, the range finder 1014 triggers a stop signal S4 to be sent to the processor unit 1015. After calculation, the processor unit can send a command S4' to activate or deactivate the traction generator 1031. In some embodiments, the stop signal S4 is one of the various factors indirectly commanding the traction generator 1031 to stop retrieving the tether 200. The predetermined value set forth that causes the range finder 1014 to trigger the stop signal S4 may be a function based on the instantaneous positioning information, such as the roll, pitch, yaw, of the displacement compensation unit 101 and/or the instantaneous environmental information, such as the wind strength and wind direction. Prior to receiving the command S4', the traction generator 1031 retrieving the tether 200 at a controlled and dynamically adjusted speed so as to approach a desired and predetermined tension on the tether 200. The desired tension, or the first predetermined value referred herein, can be set in advance in the processing unit 1015.

To detect the tension of the tether 200, the traction control module 103 of the system 100 includes a tension meter unit 1032 which instantaneously measures the tension of the tether 200 and transmit the measured tension to the processor unit 1015. During the process of retrieving the tether 200, when the tension of the tether 200 is greater than the desired tension or a first predetermined value, indicating abnormal environmental condition has taken place, e.g., stiff crosswind or huge wave, therefore the processor unit 1015 may transmit the command S4' to the traction generator 1031 to release the tether 200 in order to prevent collision between the aerial vehicle 110, the displacement compensation unit 101, and the docket platform of the watercraft, or to prevent damage of the tether 200 due to excessive tension.

In some embodiments, when the tether 200 is retrieved to a certain extent such when the distance between the aerial vehicle 110 and the displacement compensation unit 101 reaches sufficient proximity (e.g., to a predetermined value), a stop signal S4 is triggered to be sent from the range finder 1014 to the processor unit 1015, and the processor unit 1015 can then transmit a command S4' to the traction generator 1031 to stop the tether 200 from being tractioned. In some embodiments, simultaneously or subsequently, the tether 200 can be further locked down by a mechanical device in order to facilitate the following procedure of aerial vehicle 110 handling after complete landing. The traction control module 103 further includes a lockdown unit 1033 which is configured to receive a command S5 from the processor unit 1015 based on the calculation result of at least partly on the measured value of the tension meter unit 1032. In some embodiments, when the range finder 1014 outputting the stop signal S4 to the processor unit 1015, the processor unit 1015 can also adjust the setting of a desired tension on the tether 200 to a second predetermined value by sending the command S4' to the traction generator 1031. When the value measured by the tension meter unit 1032 reaches such second predetermined value and feedback the tension information S6 to the processor unit 1015, the processor unit 1015 can then output a command S5 to the lockdown unit 1033 to lock down the tether 200. Specifically, after receiving the stop signal S4, the processor unit 1015 may simultaneously output a command S4' to stop the traction generator 1031 and output a command S5 to lockdown tether 200. Alternatively, the processor unit 1015 may output a command S4' to adjust the desired tension on the tether 200 to the second predetermined value, and subsequently output the command S5 based on the feedback of the value measured by the tension meter unit 1032 to lockdown the tether 200.

The system 100 can guide the aerial vehicle 110 to land on a watercraft by automatic control, human intervention, or both. For example, referring to FIG. 1, the system 100 further includes a remote controller 105 wirelessly coupled to the traction control module 103. An operator may use the remote controller 105 to retrieve the tether 200 at specific timing, tension, and speed determined by the operator. However, the range finders 1102, 1014 can still serve their respective purpose to trigger responses from the aerial vehicle 110 and the traction generator 1031 so as to assist the landing procedure. The advantage of having human intervention to the system 100 is to cope with emergency condition that the signals in the system 100 may not properly response thereto. For example, the first predetermined value and the second predetermined value can be set in the processor unit 1015 in advance to automatically control the actuation of the traction generator 1031. Alternatively, an operator can change the value of the first predetermined value or the second predetermined value in view of environmental factors or emergency conditions. In some embodiments, human intervention can be prioritized over automatic control.

Referring to FIG. 2B, FIG. 2B illustrates a perspective view of a displacement compensation unit and a traction control module, according to some embodiments of the present disclosure. The displacement compensation unit 101 further includes a vibration reduction unit 107 disposed at the level of the top portion 101T of the displacement compensation unit 101. The vibration reduction unit 107 may compose of suitable material and structures (such as honeycomb structure) that absorb the vibration of the aerial vehicle 110 engaged with the top portion 101T of the displacement compensation unit 101. The top portion 101T and the bottom portion 101B are designed with a dimension that is proportion to the aerial vehicle to be landed thereon. Too large the scale of the displacement compensation unit 101 may serve against the portability and storage of the displacement compensation unit 101 on the watercraft. The vibration reduction unit 107 is an add-on component separated from the displacement compensation unit 101 and can be stored separately. An area of a vertical projection of the vibration reduction unit 107 is greater than the bottom portion 101B of the displacement compensation unit 101 in order to provide additional contact surface area with the aerial vehicle 110. As shown in FIG. 2B, a primary dimension (e.g., a diameter) W107 of the opening in the top portion 101T can be from 5 to 10 centimeter, and a width W107' of the vibration reduction unit 107 can be from 100 to 200 centimeter. In some embodiments, a ratio of the width W107' to the primary dimension W107 can be in a range from about 10 to 40.

Present disclosure also provides a method for controlling a system for aerial vehicle landing. The method allows the aerial vehicle to land under severe weather or environmental conditions such as on a swaying docket of a watercraft on water and/or under strong wind environment.

Referring to FIG. 1, FIG. 2A, FIG. 2B, and FIG. 3, in some embodiments, a method for controlling a system 100 for aerial vehicle 110 landing includes step 301: outputting a positioning information S1 of a displacement compensation unit 101 to an aerial vehicle 110, wherein the displacement compensation unit 101 includes at least one actuators 101A connected to a top portion 101T and a bottom portion 110B of the displacement compensation unit 100 and is configured to provide a displacement compensated top portion 101T; step 302: engaging the displacement compensation unit 101 with the aerial vehicle 110 through a tether 200; step 303 (optional): establishing a predetermined tension on the tether 200 by a traction control module 103 connected to the tether 200; and step 304: tractioning, through the tether 200, the aerial vehicle 110 toward the top portion 101T of the displacement compensation unit 101.

In step 301, a positioning information S1 of the displacement compensation unit 101 is outputted from a communication module 1011 of the displacement compensation unit 101 to a communication module 1101 of the aerial vehicle 110. The respective communication modules 1011, 1101 can be implemented by radio frequency communication module, for example, via Wi-Fi in star network, tree network, or in mesh network. The structure of the displacement compensation unit 101 is previously described in FIG. 1, FIG. 2A, FIG. 2B, and is not repeated here for brevity. The AHRS 1012 reads the vertical deviation of the pitch and roll of the displacement compensation unit 101 and send the spatial information signal S2 to the processor unit 1015. After calculation, the processor unit 1015 further control the orientation, stretch, or withdrawal of each of the at least one actuators 101A to achieve a movement-free, or displacement compensated, top portion 101T. In some embodiments, the positioning information S1 includes at least the information gathered from two or more GSPS 1013, as well as the information gathered from the AHRS 1012 that both installed on the displacement compensation unit 101. In some embodiments, the positioning information S1 outputs an information collected by the beacon 1000 that is associated with the position, the speed, the attitude, and the headings, of the displacement compensation unit 101 to the aerial vehicle 110. Alternatively stated, the beacon 1000 navigates the aerial vehicle 110 through the transmission of the positioning information S1.

In some embodiments, when a distance between the aerial vehicle 110 and the displacement compensation unit 101 is about 200 to 300 meters, the aerial vehicle 110 may start descending toward the displacement compensation unit 101. During this time period, a barometer (not shown) or a global satellite positioning system (not shown) on the aerial vehicle 110 can be used to provide an altitude information to the aerial vehicle 110. When descending to a predetermined altitude, such as from 5 to 10 meters, the aerial vehicle 110 start engaging with the displacement compensation unit 101, as described in step 302, and in some embodiments, switching the altitude sensing device from the device used previously (e.g., a barometer or a global satellite positioning system) to a range finder 1102 carried on the aerial vehicle 110.

Figure 4:
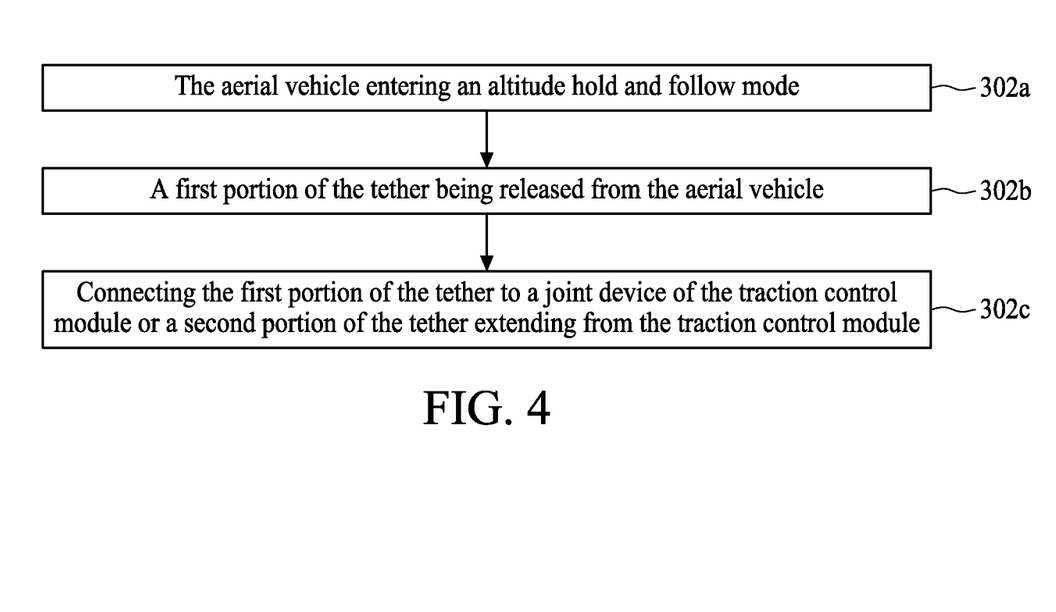
FIG. 4 is a flow of operations showing a method for controlling a system for aerial vehicle landing, according to some embodiments of the present disclosure.

In step 302, the displacement compensation unit 101 and the aerial vehicle 110 enter an engagement procedure. When preparing to land on a swaying platform such as the docket of a watercraft, the aerial vehicle 110 hovers within sufficient proximity over the displacement compensation unit 101. For example, the aerial vehicle 110 enters an altitude-hold and follow mode (see step 302a of FIG. 4) when reaching sufficient proximity, for example, 3 m to 5 m, with respect to the displacement compensation unit 101. The distance between the aerial vehicle 110 and the displacement compensation unit 101 can be determined by the range finder 1102 carried by the aerial vehicle 110. The altitude-hold and follow mode allows the aerial vehicle 110 being hold at a fixed altitude, for example, from 5 to 7 meters, appeared on a barometer and/or a global satellite positioning system carried by the aerial vehicle 110. The sea level of the altimeter can be set to be the position where the aerial vehicle 110 took off, for example, the top portion 101T of the displacement compensation unit 101. In the meantime, the aerial vehicle 110 is set to follow the displacement compensation unit 101 based on the positioning information S1 received by the communication module 1101.

Once the aerial vehicle 110 enters the altitude-hold and follow mode, the tether 200 carried by the aerial vehicle 110 is released aiming toward the traction control module 103. In some embodiments, the end of the tether 200 further away from the aerial vehicle 110 is engaged with the joint device (not shown) of the traction generator 1031, such as a mechanical hook, a magnetic coupling device, an electromagnetic coupling device, or the like. In some embodiments, a first portion 200A of the tether 200 released from the aerial vehicle 110 is engaged with a second portion 200B of the tether 200 extending from the traction generator 1031 of the traction control module 103. Engaging the tether 200 with the joint device or engaging the first portion 200A with the second portion 200B may involve human intervention where an operator remotely control the release of the tether 200 from the aerial vehicle 110, and/or an operator manually connect the tether 200 and the joint device, and/or an operator manually connect the first portion 200A and the second portion 200B.

After the completion of the engagement procedure (e.g., step 302 of FIG. 3), a predetermined tension is established on the tether 200, as provided in the optional step 303, by at least one of the following measures: (1) exerting an upward force $F_U$ on the tether 200 by having the aerial vehicle 110 climbing the altitude within a proximity range over the traction control module 103; and/or (2) exerting a traction force $F_T$ on the tether 200 by retrieving the tether 200 from the traction generator 1031. The straightened tether 200 is more efficient in terms of delivering the traction force from the traction control module 103 to the aerial vehicle 110 in the following tractioning procedure (step 304). In some embodiments, the operator may control the traction generator 1031 to exert the traction force $F_T$ on the tether 200 by using a remote controller 105 communicatively coupled to the traction control module 103. On the other hand, the same or the other operator may control the altitude of the aerial vehicle 110 to exert the upward force $F_U$ on the tether 200 by using a remote control as well. In some embodiments, both the traction force $F_T$ and the upward force $F_U$ are exerted on the tether 200 in order to establish the predetermined tension value on the tether 200. In some embodiments, a tension meter unit 1032 coupled to the tether 200 may measure the tension value as it builds up.

It should be noted that, after the aerial vehicle 110 and the traction control module 103 is connected by the tether 200, the aerial vehicle 110 still closely follow the position of the displacement compensation unit 101 by satellite-guided navigation information outputted by the beacon 1000, for example, a real time kinematic (RTK) positioning approach, which implemented on the two or more global satellite positioning systems (GSPS) 1013, or Global Navigation Satellite System (GNSS). The positioning information S1 of the displacement compensation unit 101 is outputted to the aerial vehicle 110 because the displacement compensation unit 101 is designed to be disposed in proximity to the traction control module 103, or in some embodiments, the traction control module 103 is integrated or affixed to a portion of the displacement compensation unit 101. Through these accurate navigation activities between the aerial vehicle 110 and the displacement compensation unit 101, tether connection can be realized and further prepare for tractioning.

After the completion of the optional tension establishment procedure (e.g., step 303 of FIG. 3), the tether 200 tractions the aerial vehicle 110 toward the displacement compensation unit 101, as provided in step 304. A traction force $F_T$ is then applied to the aerial vehicle 110 via the tether 200. During the period of applying the traction force $F_T$, the upward force $F_U$ is still in place keeping the tether 200 straight. In some embodiments, the processor unit 1015, after calculating the signals received, sends out a command S4' to the traction generator 1031 to activate the tractioning at an intended tractioning speed and an intended tractioning force, which may also be calculation results based on the signals received. Note the signal received by the processor unit 1015 may also include the environmental information such as instantaneous and forecast wind direction, Beaufort wind scale, wave height, etc., based on sensors installed on the displacement compensation unit 101 or elsewhere and transmits signal sensed to the displacement compensation unit 101. In any instantaneous moment during step 304, the traction force $F_T$ is greater than the upward force $F_U$ so as to draw the aerial vehicle 110 closer to the traction control module 103 and the displacement compensation unit 101, until a bottom (e.g., the landing gear) of the aerial vehicle 110 is engaged with the top portion 101T of the displacement compensation unit 101. During the period of applying the traction force $F_T$, the tether 200 may be perpendicular to or angled with the traction control module 103, as long as the tether 200 maintains its straightness. In some embodiments, the tractioning procedure may involve human intervention where an operator control the traction generator 1031 through a remote controller 105 at a speed and tension determined by the operator.

Figure 5:
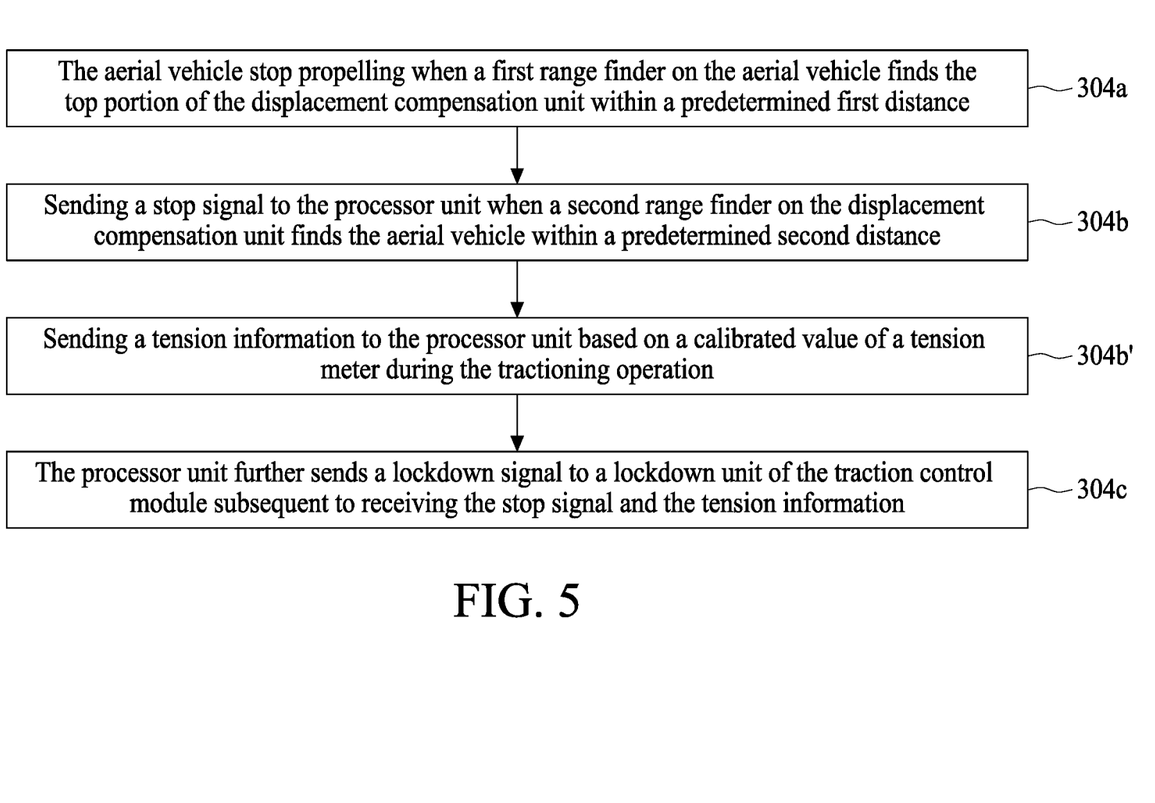
FIG. 5 is a flow of operations showing a method for controlling a system for aerial vehicle landing, according to some embodiments of the present disclosure.

During the tractioning of the aerial vehicle 110 toward the top portion 101T, several actions take place to assist the tractioning procedure, as provided in FIG. 5. In step 304a, when a range finder 1102 on the aerial vehicle 110 determines that a distance between a bottom of the aerial vehicle 110 and the top portion 101T of the displacement compensation unit 101 reaches sufficient proximity, or reaches a predetermined value to stop propelling, for example, 30 centimeter, the range finder 1102 triggers the aerial vehicle 110 to stop propelling so that the upward force $F_U$ drops to zero at this point to prepare for landing. The predetermined value set forth may be varied depending on the dimension of the aerial vehicle to be landed and the instantaneous weather condition. In step 304b, when a range finder 1014 on the displacement compensation unit 101 determines that a distance between a bottom of the aerial vehicle 110 and the top portion 101T of the displacement compensation unit 101 reaches sufficient proximity or reaches a predetermined value to stop, the range finder 1014 provides a stop signal S4 to the processor unit 1015, which after calculation, may conditionally send out a command to the traction generator 1031 and/or a command S5 to the lockdown unit 1033 to stop retrieving the tether 200. The predetermined value to stop can be approximately a height of the landing gear of the aerial vehicle 110, or the distance between the ventral of the aerial vehicle 110 and the top portion 101T of the displacement compensation unit 101. In addition to the predetermined value to stop set forth, instantaneous positioning information, such as the roll, pitch, yaw, of the displacement compensation unit 101 and/or the instantaneous environmental or weather information, such as the wind strength and wind direction may also be taken by the processor unit 1015 for calculation and conditionally send out the command S4' and/or S5 to the traction generator 1031 and/or the lockdown unit 1033 to stop retrieving the tether 200.

As described in step 304b', other information that the processor unit 1015 receives for calculation and determining whether to stop retrieving the tether 200 includes, but not limited to, the tension or the tensile stress build up on the tether 200 falling at a predetermined value (the tension meter unit 1032 of the traction control module 103 used to measure the instantaneous tension of the tether 200), environmental information such as instantaneous or forecast wind direction, Beaufort wind scale, wave height, etc., collected by the sensors installed on the displacement compensation unit 101 or other suitable locations.

After receiving and calculating the information required, as previously described, the processor unit 1015 conditionally send out the command S4' to the traction generator 1031 and/or the command S5 to the lockdown unit 1033 to stop retrieving the tether 200. In some embodiments, the processor unit 1015 may send out the command S5 to the lockdown unit 1033, and optionally, sending out the command S4' to the traction generator 1031 during step 304c. During the tractioning operation in step 304, the command S4' sent to the traction generator 1031 activating the tractioning may also contain the tractioning speed and tractioning force exerted on the tether 200. In step 304c, the command S5 sent to the lockdown unit 1033 may also contain a lockdown force exerted on the tether 200. The lockdown force can be set greater than the tractioning force, and hence, once the tether 200 is locked down by the lockdown unit 1033, continue activation of the traction generator 1031 may not affect the lockdown status of the tether 200. Optionally, after step 304c, the command S4' sent to the traction generator 1031 deactivating the tractioning can be sent subsequently to the command S5 sent in step 304c.

The tension meter unit 1032 together with the traction generator 1031 may further adopt a safety design to avoid collision among the aerial vehicle 110, the displacement compensation unit 101, and the platform of the watercraft. For example, during the tractioning procedure (step 304), when the tension of the tether 200 is greater than a first predetermined value, indicating an abnormal environmental condition such as stiff crosswind or huge wave have just taken place, and hence the tether 200 is released to react with such abnormal environmental condition. For example, when a huge wave passes, the watercraft, and hence the displacement compensation unit 101, may experience an abrupt vertical displacement which unavoidably exerts a tensile stress greater than the first predetermined value to the tether 200. A clutch normally affixed to the traction generator 1031 may be detached from the traction generator 1031 under such conduction to freely release the tether 200 so that the aerial vehicle 110 may not be pulled toward the watercraft or the displacement compensation unit 101 and causing unnecessary collisions and damages, or even exceeding the mechanical strength that the tether 200 is designed to endure. For another example, when a stiff crosswind takes place, the aerial vehicle 110 may pull from one end of the tether 200 to deviate from a vertical projection over the displacement compensation unit 101, and thereby exerting a tensile stress greater than the predetermined value to the tether 200. A clutch normally affixed to the traction generator 1031 may be detached from the traction generator 1031 under such condition to freely release the tether 200 so that the tether 200 may not exceed the mechanical strength that it is designed to endure.

In one exemplary aspect, a system for aerial vehicle landing is provided. The system includes a displacement compensation unit and a traction control module. The displacement compensation unit includes a top portion, a bottom portion, and at least one actuators connected to the top portion and the bottom portion, configured to provide a displacement compensated top portion to engage with an aerial vehicle. The traction control module includes a traction generator connected to a tether. Through the tether the aerial vehicle is tractioning toward the top portion of the displacement compensation unit.

In another exemplary aspect, a method for controlling a system for aerial vehicle landing is provided. The method includes (1) outputting a positioning information of a displacement compensation unit to an aerial vehicle, wherein the displacement compensation unit comprises at least one actuators connected to a top portion and a bottom portion of the displacement compensation unit and is configured to provide a displacement compensated top portion; (2) engaging the displacement compensation unit with the aerial vehicle through a tether; and (3) tractioning, through the tether, the aerial vehicle toward the top portion of the displacement compensation unit.

The foregoing outlines structures of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for aerial vehicle landing, comprising:
   a displacement compensation unit, having a top portion and a bottom portion, wherein the displacement compensation unit comprises at least one actuators connected to the top portion and the bottom portion, configured to provide a displacement compensated top portion to engage with an aerial vehicle; and
   a traction control module disposed between the top portion and the bottom portion of the displacement compensation unit, the traction control module having a traction generator connected to a tether, through the tether the aerial vehicle being tractioning toward the top portion of the displacement compensation unit.

2. The system of claim 1, wherein the displacement compensation unit further comprises:
   a communication module configured to transmit a first signal of the displacement compensation unit to the aerial vehicle.

3. The system of claim 2, wherein the displacement compensation unit further comprises:
   two or more global satellite positioning system providing a portion of the first signal to the communication module.

4. The system of claim 1, wherein the displacement compensation unit further comprises:
   an attitude and heading reference system (AHRS) connected to a processor unit, the processor unit outputting a third signal to the at least one actuators based on a second signal from the AHRS so as to provide the displacement compensated top portion of the displacement compensation unit.

5. The system of claim 4, wherein the displacement compensation unit further comprises:
   a range finder configured to probe a distance between the top portion of the displacement compensation unit and a bottom of the aerial vehicle, and transmit a fourth signal to the processor unit when the distance is equal to or smaller than a predetermined value.

6. The system of claim 5, wherein the traction control module further comprises:
   a tension meter unit; and
   a lockdown unit configured to receive a fifth signal from the processor unit to lock down the tether.

7. The system of claim 1, further comprising a remote controller wirelessly connected to the traction control module.

8. The system of claim 1, wherein the tether comprises a first portion extending from the aerial vehicle and a second portion extending from the traction control module.

9. The system of claim 1, further comprising a vibration reduction unit substantially at the level of the top portion of the displacement compensation unit, a vertical projection of the vibration reduction unit having an area greater than the bottom portion of the displacement compensation unit.

10. The system of claim 1, further comprising a fixating device at the bottom portion of the displacement compensation unit, the fixating device being configured to fixate the system on a platform of a watercraft.

11. A method for controlling a system for aerial vehicle landing, the method comprising:
outputting a positioning information of a displacement compensation unit to an aerial vehicle, wherein the displacement compensation unit comprises at least one actuators connected to a top portion and a bottom portion of the displacement compensation unit and is configured to provide a displacement compensated top portion;
engaging the displacement compensation unit with the aerial vehicle through a tether; and
tractioning, through the tether, the aerial vehicle toward the top portion of the displacement compensation unit.

12. The method of claim 11, wherein outputting the positioning information comprises:
outputting, by a communication module of the displacement compensation unit, the positioning information gathered from two or more global satellite positioning systems on the displacement compensation unit to the aerial vehicle.

13. The method of claim 12, wherein engaging the displacement compensation unit to the aerial vehicle, further comprising:
the aerial vehicle entering an altitude-hold and follow mode;
a first portion of the tether being released from the aerial vehicle; and
connecting the first portion of the tether to a joint device of the traction control module or a second portion of the tether extending from the traction control module.

14. The method of claim 13, further comprising establishing a predetermined tension on the tether by a traction control module connected to the tether, wherein establishing the predetermined tension comprises retrieving the tether by a traction generator of the traction control module.

15. The method of claim 14, wherein tractioning the aerial vehicle comprises:
the aerial vehicle stop propelling when a first range finder on the aerial vehicle finds the top portion of the displacement compensation unit within a predetermined first distance; and
sending a stop signal to the processor unit when a second range finder on the displacement compensation unit finds the aerial vehicle within a predetermined second distance.

16. The method of claim 15, further comprising sending a tension information to the processor unit based on a measured value of a tension meter during the tractioning operation.

17. The method of claim 16, further comprising:
the tether being automatically released when the value of the tension meter is greater than a predetermined value.

18. The method of claim 16, wherein the processor unit further sends a lockdown signal to a lockdown unit of the traction control module subsequent to receiving the stop signal and the tension information.

19. The method of claim 11, wherein tractioning the aerial vehicle comprises operating a remote controller of the traction control module to retrieve the tether.

20. The method of claim 11, further comprising:
controlling, by a processor unit, the at least one actuators based on an information from an attitude and heading reference system (AHRS) of the displacement compensation unit so as to provide the displacement compensated top portion.

* * * * *